Figure 1:
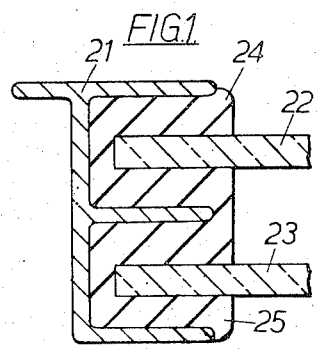

United States Patent [19]
Britton

[11] 3,872,198
[45] Mar. 18, 1975

[54] METHOD OF MAKING MULTIPLE-GLAZED UNITS
[76] Inventor: John C. Britton, Fritton Lodge, 103 Gayton Rd., King's Lynn, Norfolk, England
[22] Filed: Jan. 8, 1973
[21] Appl. No.: 321,674

[52] U.S. Cl. ................ 264/46.6, 156/109, 156/78, 161/159, 161/160, 161/161, 161/190, 161/192, 264/271, 264/275, 264/328, 264/DIG. 83
[51] Int. Cl. ..................... C03c 27/00, B29d 27/00
[58] Field of Search ............ 161/45, 159, 160, 161, 161/190, 192, 203; 156/109, 78; 52/616, 171, 172, 402, 403; 264/45, 328, 271, 275, 59

[56] References Cited
UNITED STATES PATENTS

| | | | |
|---|---|---|---|
| 3,068,136 | 12/1962 | Reid | 156/109 |
| 3,473,988 | 10/1969 | Rullier et al. | 161/45 |
| 3,546,038 | 12/1970 | Smith | 156/109 |
| 3,553,913 | 1/1971 | Eisenberg | 52/616 |
| 3,616,113 | 10/1971 | Sawyer | 161/160 |
| 3,733,237 | 5/1973 | Wolff | 156/109 |
| 3,775,914 | 12/1973 | Patil | 52/616 |
| 3,786,121 | 1/1974 | Schaerer | 264/DIG. 14 |

FOREIGN PATENTS OR APPLICATIONS

| | | |
|---|---|---|
| 1,035,229 | 5/1963 | United Kingdom |
| 402,366 | 5/1966 | Switzerland |
| 26,419 | 11/1915 | Norway |
| 1,905,846 | 9/1970 | Germany |
| 1,352,196 | 1/1964 | France |
| 223,757 | 10/1962 | Austria ............... 156/109 |

Primary Examiner—George F. Lesmes
Assistant Examiner—Paul J. Thibodeau
Attorney, Agent, or Firm—Brisebois & Kruger

[57] ABSTRACT

A glazing insert for a door or a window frame is formed of a substantially rigid foam plastics material, such as polyethylene, polypropylene, P.V.C. or urea formaldehyde. The insert may be formed by moulding, extrusion, or machining operations or may be formed in situ in a channel in the door or window frame by injection of the foam plastics material into the channel. A single, double, treble, or multiple-glazed unit may be formed by positioning an insert in a frame and inserting one or more sheets of glazing material into corresponding grooves in the insert. Alternatively, the unit may be formed by supporting at least one sheet of glazing material in a channel in a frame and injecting the foam plastics material into the channel.

3 Claims, 8 Drawing Figures

METHOD OF MAKING MULTIPLE-GLAZED UNITS

This invention relates to door and window frame glazing inserts.

According to the invention, a glazing insert for a door or window frame is formed of a substantially rigid foam plastics material.

The foam plastics material may, for example, be polyethylene, polypropylene, P.V.C. or urea formaldehyde, and is preferably an impervious sealed cellular foam, capable of withstanding appreciable compressive forces. The glazing insert may be formed before installation by, for example, extrusion or moulding, or may be formed in situ.

Embodiments of the invention will now be described, by way of example, with reference to the accompanying drawings, in which:

FIGS. 1 – 8 are transverse sectional views of window or door glazing frames with glazing inserts in accordance with the invention.

FIGS. 1 – 8 of the drawings show examples of the use of foam plastics inserts within glazing frames. The inserts are made of materials such as those mentioned above, the inserts being formed, before installation in the frames, by moulding, extrusion, or any other suitable shaping operation, or being formed in situ within the frame.

FIG. 1 shows a double-channel frame section 21, in each channel of which is supported a sheet 22, 23 of glass, acrylic, perspex or other suitable material, the edges of the sheets 22 and 23 being embedded in plastics foam inserts 24 and 25, respectively. This configuration provides a double-glazed window which is very well sealed around the edges.

Figure 5:
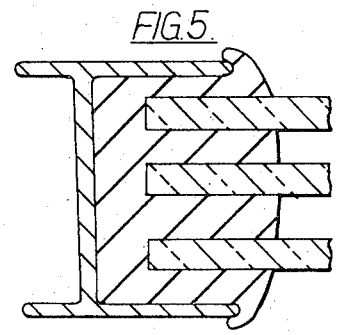
Figure 2:
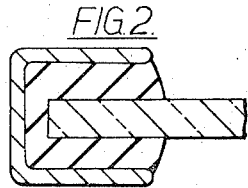
Figure 3:
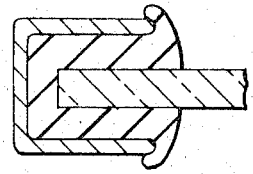
Figure 4:
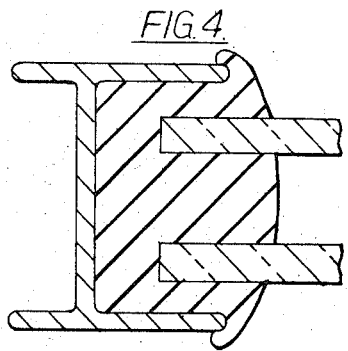

A U-section frame, for example for use as a sliding double-glazing unit, is shown in FIGS. 2 and 3. The foam plastics insert may have its free surface formed in any desired shape, such as rounded as shown in FIG. 2, or lipped round the edges of the channel section as shown in FIG. 3. Further examples of double-and multiple-glazing units formed by embedding the edges of the glass sheets in inserts in accordance with the invention are shown in FIGS. 4 and 5.

In any of these embodiments, the glass or other sheet may be supported within the frame by metal or plastics extrusions, brackets or clips, etc.

Figure 6:
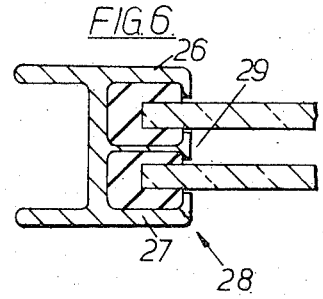

FIG. 6 shows an example of a frame section in which the foam plastics inserts may be formed in situ by injection of the foam after the glass has been installed. The outside edges of limbs 26 and 27 of the frame section 28 are turned inwards, preferably during manufacture, so that they almost abut against the glass, thereby forming a barrier for the foam during injection. A central T-shaped web 29 is formed centrally in the frame section to act as a foam barrier between the sheets of glass. Again, the head of the T almost abuts against the glass on either side. Instead of turning-in the edges of the frame section, cover members might be temporarily positioned over the mouth of the channel to retain the foam during injection.

Figure 7:
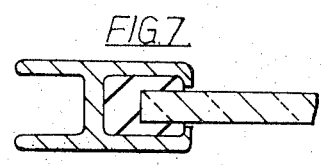
Figure 8:
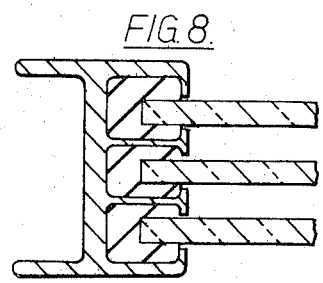

FIGS. 7 and 8 show frames which are single- and treble-glazed, respectively, in a similar manner.

Using the known manufacturing processes for forming sealed double-glazing units, the sheets of glass cannot be spaced apart by more than about half an inch, whereas better heat insulation properties are obtained with a larger spacing, say three-quarters of an inch, and sound insulation properties are greatly enhanced by spacing the sheets of glass much further apart, say 8 or 10 inches.

By using foam plastics inserts in accordance with the invention, it is possible to manufacture sealed double-, treble-, or multiple-glazed door or window units in which the sheets of glass are spaced apart by any desired distance.

If necessary, the foam plastics inserts may be bonded to the frames or other members by any suitable method such as heat-treatment, pressure, compression or adhesives, depending upon the particular materials being bonded.

The window or door glazing frames may be formed of any suitable material such as a metal or alloy, for example an aluminium alloy, or wood or other suitable non-metallic material, and may be of any other suitable cross-section besides those sections illustrated in the drawings.

The foam plastics inserts in accordance with the invention are capable of relatively simple and cheap manufacture, and grooves to accommodate any required glass thickness are readily formed therein. The inserts may be formed from bars of the foam plastics material, and the grooves may be formed therein by a machining operation. The inserts may form a watertight and air-tight seal between the glass or other glazing material and the frame, and their heat insulation properties may prove very advantageous especially when metal or alloy frames are used.

I claim:

1. A method of forming a multiple-glazed door or window unit, comprising inserting at least two sheets of glazing material in parallel channels in a frame, each of said channels having a bottom and side walls, said side walls having flange portions which project inwardly of said channels and so closely approaching opposite surfaces of the respective sheet of glazing material as to provide only a small clearance adjacent said surfaces; and injecting a foam plastics material into the space between the bottom and side walls of each channel and the respective sheet of glazing material to form a substantially rigid foam plastics material insert, while utilizing said flange portions to retain the injected material within said channels.

2. A method according to claim 1, in which said inserts are formed in all of the channels in one injection operation.

3. A method as claimed in claim 1 in which said foam plastics material is selected from the group consisting of polyethylene, polypropylene, polyvinylchloride, and urea formaldehyde.

* * * * *